(12) United States Patent
Wu et al.

(10) Patent No.: US 7,513,235 B2
(45) Date of Patent: Apr. 7, 2009

(54) METHOD AND APPARATUS FOR OPERATING IMPULSE CHARGER FOR TRANSIENT TORQUE MANAGEMENT

(75) Inventors: Ko-Jen Wu, Troy, MI (US); James C. Elmslie, Oxford, MI (US); Jian Jun Zhang, Oakland Township, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 0 days.

(21) Appl. No.: 11/352,902

(22) Filed: Feb. 13, 2006

(65) Prior Publication Data

US 2007/0186898 A1  Aug. 16, 2007

(51) Int. Cl.
*F02D 13/00* (2006.01)
*F02M 35/10* (2006.01)

(52) U.S. Cl. .................................. 123/184.53; 123/405

(58) Field of Classification Search ................................ 123/184.53–184.56, 336, 337, 402–405, 123/481

See application file for complete search history.

(56) References Cited

U.S. PATENT DOCUMENTS

| 4,691,670 | A | * | 9/1987 | Bonisch et al. ............. 123/403 |
| 4,796,584 | A | * | 1/1989 | Goto et al. .................. 123/403 |
| 4,890,582 | A | * | 1/1990 | Schatz et al. ........... 123/184.54 |
| 5,105,784 | A | * | 4/1992 | Davis et al. ................. 123/337 |
| 5,143,038 | A | * | 9/1992 | Dahlgren et al. ............ 123/403 |
| 6,422,184 | B1 | * | 7/2002 | Kreuter ................. 123/184.54 |
| 6,637,405 | B2 | * | 10/2003 | Kreuter ...................... 123/337 |
| 6,810,851 | B2 | * | 11/2004 | Kreuter ...................... 123/337 |
| 6,832,583 | B2 | * | 12/2004 | Hayman .................. 123/90.16 |
| 7,207,322 | B2 | * | 4/2007 | Meiwes et al. ......... 123/184.53 |
| 7,249,584 | B2 | * | 7/2007 | Rozario et al. ........... 123/198 F |
| RE39,852 | E | * | 9/2007 | Uitenbroek ................. 123/336 |
| 2004/0069272 | A1 | * | 4/2004 | Allen et al. ................. 123/481 |
| 2006/0037570 | A1 | * | 2/2006 | Hitomi et al. .......... 123/184.53 |

FOREIGN PATENT DOCUMENTS

DE   102004015835 A1 * 10/2005
WO   WO2004/055345 A1 *  7/2004

* cited by examiner

*Primary Examiner*—Hai H Huynh

(57) ABSTRACT

An engine control system in a vehicle including an internal combustion engine, a transmission coupled to the internal combustion engine, an intake manifold coupled to the internal combustion engine, an impulse charge valve coupled to the intake manifold, a controller for controlling the impulse charge valve, where the controller controls the impulse charge valve to compensate for torque transients.

20 Claims, 3 Drawing Sheets

METHOD AND APPARATUS FOR OPERATING IMPULSE CHARGER FOR TRANSIENT TORQUE MANAGEMENT

TECHNICAL FIELD

The present invention relates to the control of internal combustion engines. More specifically, the present invention relates to a method and apparatus to control an impulse charger for an internal combustion engine.

BACKGROUND OF THE INVENTION

Present consumer expectations in the automotive market have led to an increasing demand to improve driveability and increase performance for internal combustion engines in vehicles. Internal combustion engines during sudden acceleration operations or similar situations, which require a fast response to torque demand, are often affected by a delay in air flow resulting in a delay of power delivery. Impulse charging systems increase the volume of air drawn into cylinders during the start of the combustion process and reduce the delay of power delivery during demand for sudden acceleration.

SUMMARY OF THE INVENTION

The present invention is a method and apparatus for the control of impulse charging in an internal combustion engine to improve engine response and manage torque disturbances.

DESCRIPTION OF THE PREFERRED EMBODIMENT

Figure 1:
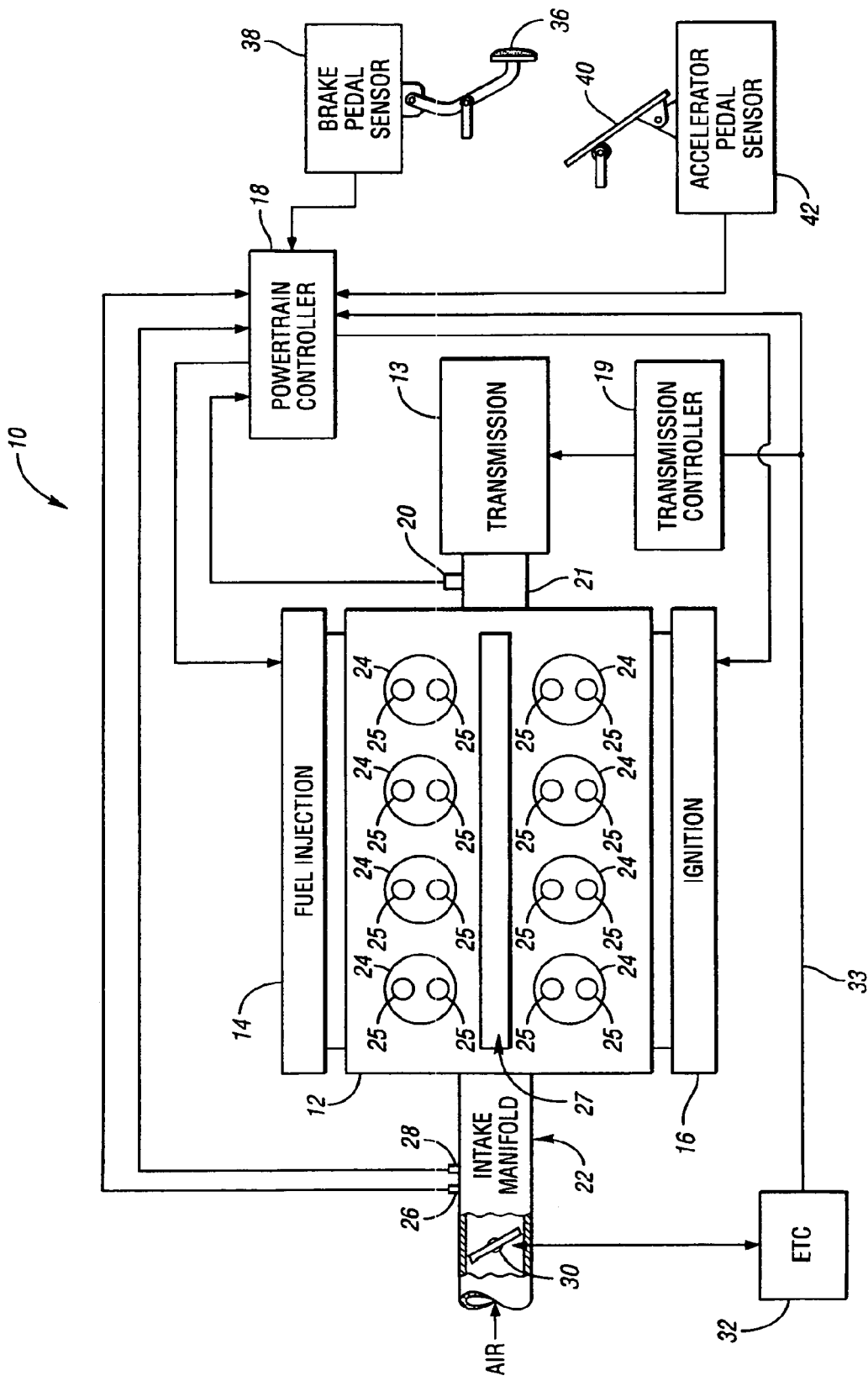
FIG. 1 is a diagrammatic drawing of the engine control system of the present invention.

FIG. 1 is a diagrammatic drawing of the vehicle control system 10 of the present invention. The control system 10 includes an internal combustion engine (ICE) 12 having fuel injectors 14 and spark plugs 16 (in the case of a spark ignition gasoline engine) controlled by an engine or powertrain controller 18. The fuel injectors in the present invention may be port mounted or mounted for direct injection into the cylinders 24. The ICE 12 crankshaft 21 speed and position are detected by a speed and position sensor 20 that generates a signal such as a pulse train to the engine controller 18.

The ICE 12, in alternate embodiments of the present invention, comprises a variable displacement internal combustion engine. A variable displacement ICE provides for improved fuel economy, as compared to fixed displacement ICE's, and torque on demand by operating on the principal of cylinder deactivation. During operating conditions that require high output torque, every cylinder of a variable displacement ICE is supplied with fuel and air to provide torque for the ICE. During operating conditions at low speed, low load, and/or other inefficient conditions for a fully-displaced ICE, cylinders may be deactivated to improve fuel economy for the variable displacement ICE and vehicle. For example, in the operation of a vehicle equipped with an eight cylinder variable displacement ICE, fuel economy will be improved if the ICE is operated with only four cylinders during low torque operating conditions by reducing throttling losses. Throttling losses, also known as pumping losses, are the extra work that an ICE must perform to pump air from the relatively low pressure of an intake manifold, across a throttle body or plate, through the ICE and out to the atmosphere. The cylinders that are deactivated will not allow air flow through their intake and exhaust valves, reducing pumping losses by forcing the ICE to operate at a higher intake manifold pressure.

The ICE 12 may further comprise a gasoline ICE or any other ICE such as a diesel engine and/or compression ignition engine as is known in the art. An intake manifold 22 provides air to the cylinders 24 of the ICE 10, the cylinders having valves 25. The valves 25 are further coupled to an actuation apparatus 27 such as used in an overhead valve (OHV) or overhead cam (OHC) engine configuration that may be physically coupled and decoupled to the valves 25 to shut off air flow through the cylinders 24. The actuation apparatus 27 in alternate embodiment comprises a variable valve lift camshaft that modifies valve lift, depending on operating conditions. An air flow sensor 26 and manifold air pressure (MAP) sensor 28 detect the air flow and air pressure within the intake manifold 22 and generate signals to the powertrain controller 18. The airflow sensor 26 is preferably a hot wire anemometer and the MAP sensor 28 is preferably a strain gauge.

An electronic throttle 30 having a throttle plate controlled by an electronic throttle controller 32 controls the amount of air entering the intake manifold 22. The electronic throttle 30 may utilize any known electric motor or actuation technology in the art including, but not limited to, DC motors, AC motors, permanent magnet brushless motors, and reluctance motors. The electronic throttle controller 32 includes power circuitry to modulate the electronic throttle 30 and circuitry to receive position and speed input from the electronic throttle 30. The electronic throttle controller 32 further includes communication circuitry such as a serial link or automotive communication network interface to communicate with the powertrain controller 18 over an automotive communications network 33. In alternate embodiments of the present invention, the electronic throttle controller 32, may be fully integrated into the powertrain controller 18 to eliminate the need for a physically separate electronic throttle controller.

A brake pedal 36 in the vehicle is equipped with a brake pedal sensor 38 to determine the amount of pressure generated by an operator of the vehicle on the brake pedal 36. The brake pedal sensor 36 generates a signal to the powertrain controller 18 to determine a braking condition for the vehicle. A braking condition will indicate a low torque/low demand condition for the variable displacement ICE 12. An accelerator pedal 40 in the vehicle is equipped with a pedal position sensor 42 to sense the position of the accelerator pedal. The pedal position sensor 42 signal is also communicated to the powertrain controller 18. In the preferred embodiment of the present invention, the brake pedal sensor 38 is a strain gauge and the pedal position sensor 42 is an absolute rotary encoder. Emission control signals are further integrated into the control system 10 to monitor and control ICE emissions.

A transmission 13 is coupled to the ICE 12 to transmit engine torque/power to the wheels of a vehicle. The transmission may comprise any known transmission in the art including an electrically variable transmission, as described in U.S. Pat. No. 5,931,757 to Schmidt and U.S. Pat. No. 6,527,658 to Holmes et al. which are hereby incorporated by reference in their entirety.

Figure 2:
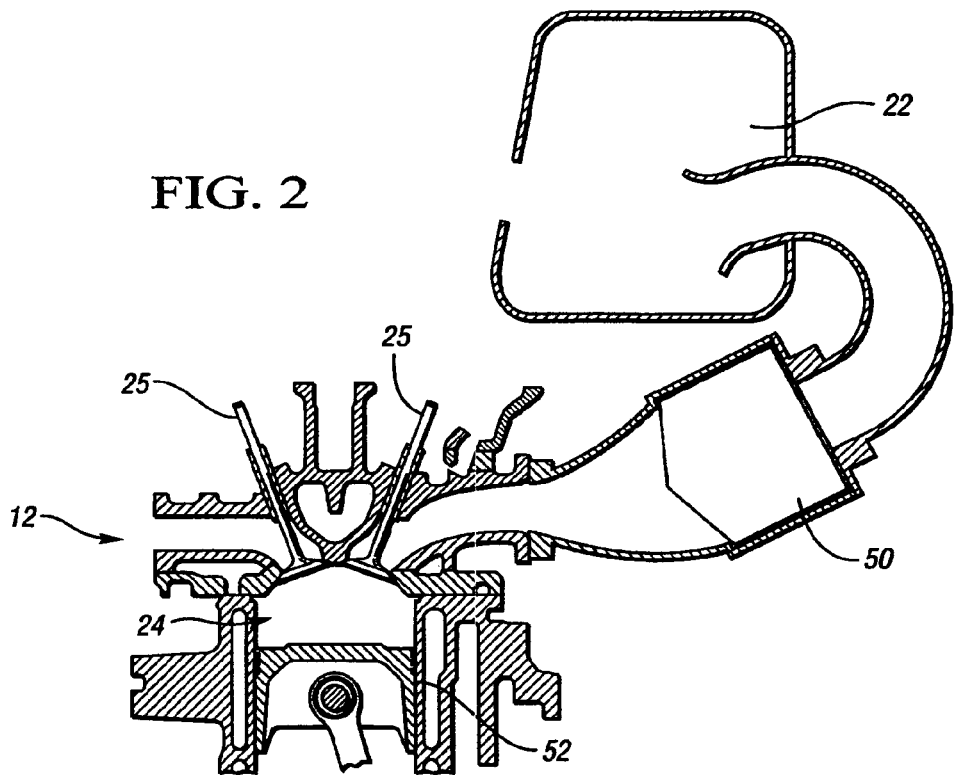
FIG. 2 is a cross sectional diagram of an engine in the present invention.

FIG. 2 is a cross-sectional drawing of the ICE 12 incorporating an impulse charger valve 50. In the preferred embodiment, each cylinder 24 will have an impulse charger valve 50 controlling the air to the cylinder. The impulse charger valve 50 comprises an electromagnetically controlled valve that is controlled by the powertrain controller 18. In standard operation, the impulse charger valve 50 is closed as the piston 52 moves downward during the intake phase, creating a vacuum by sealing the cylinder 24. Shortly prior to the piston 52 reversing direction to begin compression, the impulse charger valve 50 is opened and the pressure differential draws air into the cylinder 24 at a relatively high speed approaching sonic speed. The high velocity air also produces a pressure wave directed from the plenum 22 toward the cylinder 24, similar in effect to ram tuning in a tuned intake manifold, but at a relatively much stronger magnitude. The impulse charger valve 50 seals and captures the pressure resulting in an increased mass of air in the cylinder 24 and a concomitant increase in available engine power.

The impulse charger valve 50 may be switched open and close within a few milliseconds to provide immediate power. The fast response of the impulse charger valve(s) 50 in the present invention allows the ICE's 12 volumetric efficiency to be increased by more than twenty percent or decreased essentially to zero without moving the throttle 30 of the ICE 12. The impulse charger valve 50 provides an additional control "knob" for the powertrain controller 18 to control engine torque. In the preferred embodiment of the present invention, the impulse charger valve(s) 50 are open for engine speeds greater than substantially four thousand RPM's to allow air flow.

The present invention uses an impulse charging system to meet transient torque requirements. The impulse charging system of the present invention may be used instead of the conventional method of spark timing control or in conjunction with spark timing control to provide improved engine torque and performance. The impulse charging system of the present invention may also be used in conjunction with throttle 30 control to optimize and improve engine torque.

Figure 3:
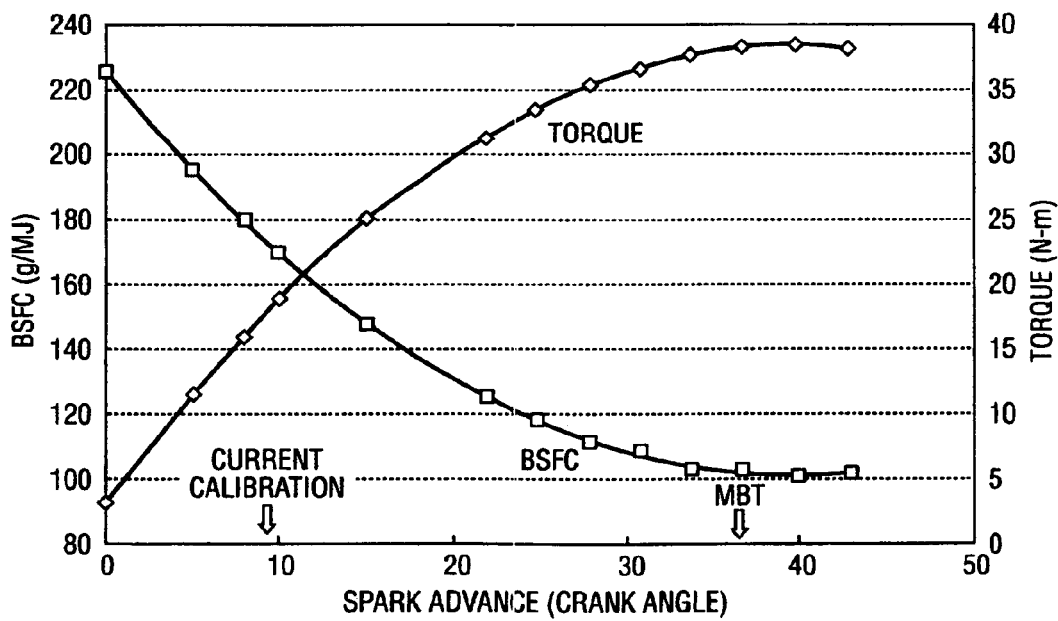
FIG. 3 is a plot illustrating spark timing torque compensation of the present invention.

During a steady state idle operation of the ICE 12, the impulse charging valves 50 are normally kept in an inactive mode (air is flowing to cylinders 24). The impulse charging valves are open in a de-energized (no current applied to valve 50) state and closed in an energized state (current applied to valve 50). The spark timing of the ICE 12 is typically calibrated near minimum best torque (MBT) for a minimum fuel consumption and the best combustion stability, as seen in FIG. 3.

Figure 4:
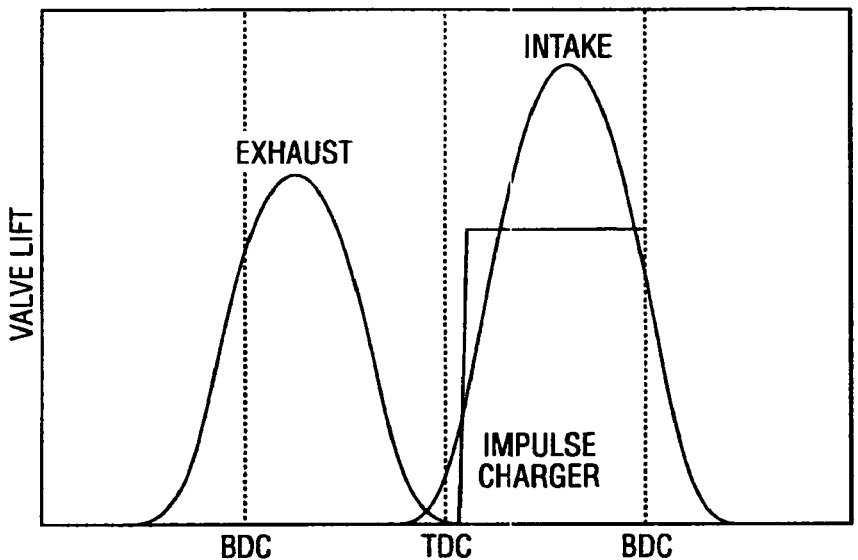
FIG. 4 is a diagram illustrating an impulse charge event.

When an engine speed drop is detected due to any sudden torque demands generated by an accessory such as a power steering pump, alternator, or air conditioning compressor, the impulse charger valves 50 are brought into action in sync with the intake valve events shown in FIG. 4, in order to meet the desired torque demand. The impulse charger event, in a preferred embodiment, comprises closing the impulse charger valve(s) 50 at substantially bottom dead center of the intake stroke in order to minimize fresh air charge backflow out of the cylinder(s) 24 and the impulse charger valve(s) 50 opens at after the exhaust valve is fully closed in order to minimize residuals, critical for idle, but still sufficiently early to avoid excessive expansion of cylinder charge. In alternate embodiments of the present invention, the impulse charge valve(s) 50 may be adjusted from closing at bottom dead center to fine tune airflow rates. The opening point of the impulse charger valve(s) 50 can be further advanced if more internal residuals are desirable. When less torque is required, the impulse charger valve(s) 50 open duration is shortened by closing it as soon as enough air is admitted into the cylinder on the intake stroke. Fuel flow rate is adjusted in accordance with air flow to vary engine torque while maintaining a desired air-fuel ratio. Effectively, the impulse charger valve(s) 50 functions as a second camshaft in series with the actual camshaft, and therefore the placement of its event is within the valve event of the actual camshaft.

Figure 5:
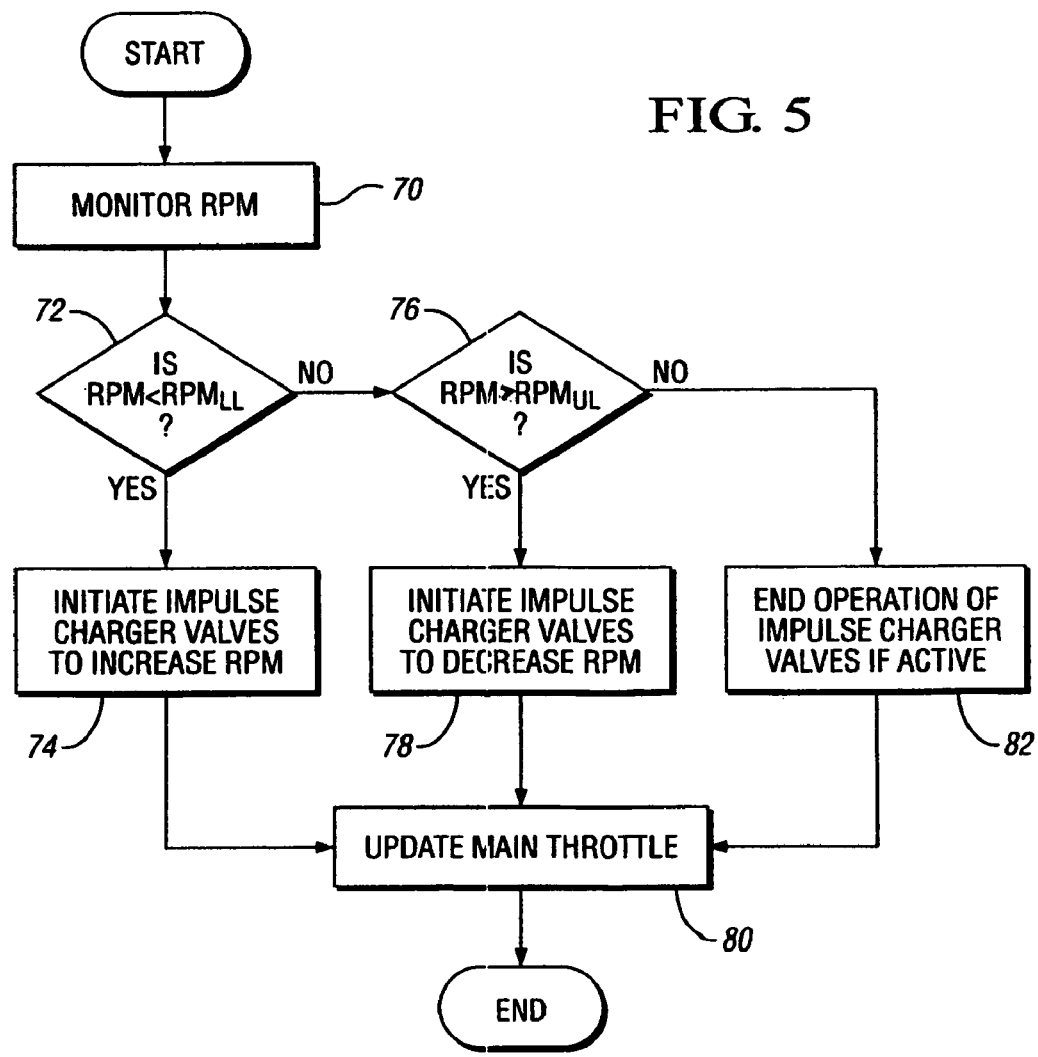
FIG. 5 is a flow chart for an embodiment of the present invention.

FIG. 5 is a flow chart of a method of the present invention. Engine speed (RPM), in the preferred embodiment, is used as a feedback signal indicative of a torque disturbance. In alternate embodiments of the present invention, mass air flow and a direct torque sensor may also be used to determine a torque disturbance. Starting at block 70, engine speed is monitored (RPM). Engine speed at Block 72 is compared to a lower limit $RPM_{LL}$. If Engine speed is less than the lower limit $RPM_{LL}$, the impulse charger valve(s) 50 are operated (as previously described) to increase torque and RPM's at block 74, and the main throttle command is updated at block 80. If engine speed is greater than $RPM_{LL}$, then at block 76 the engine speed is compared to a upper limit $RPM_{UL}$. To reduce torque, the impulse charger valve(s) 50 may be operated if they are already activated or activated with a shortened open duration during intake to reduce air flow. If engine speed is greater than $RPM_{UL}$, then at block 78, the impulse charge valve(s) 50 are operated to reduce engine RPM's, and the throttle command is updated at block 80. If the engine speed is less $RPM_{UL}$, then the impulse charger valve(s) 50 are no longer operated and the throttle command is updated at block 80. When necessary, spark timing control may be maintained in combination with the control of the impulse charger valve(s) 50 to provide the desired torque compensation.

The impulse charger valve(s) 50 operation may also be used in conjunction with the operation of a variable displacement internal combustion engine The impulse chargers may be used to supply torque to enable the variable displacement engine to extend operation in a partially displaced operating mode to improve gas mileage. For example, a transient torque disturbance may normally force a partially displaced engine to enter full displacement to compensate for the torque disturbance. The impulse charger valve(s) 50 may be used to compensate for and/or supply torque to compensate for this torque disturbance to allow the variable displacement internal combustion engine to stay in a partially displaced operating mode.

Similarly, the impulse chargers may be used to control the operation of an electrically variable transmission. The impulse chargers can be used to supply torque during operating conditions that require a transient torque increase. Other potential applications which can use impulse chargers to increase and/or decrease torque include transmission shift transients, torque converter lock-up schedule, vehicle launch enhancements particularly for neutral idle, and vehicle traction control. The present invention may be applied to any powertrain system that involves discrete step changes which require torque smoothing to improve driveability such as two step valve lift, displacement on demand, or step transmission.

While this invention has been described in terms of some specific embodiments, it will be appreciated that other forms can readily be adapted by one skilled in the art. Accordingly, the scope of this invention is to be considered limited only by the following claims.

The invention claimed is:

1. An engine control system in a vehicle comprising:
an internal combustion engine;
a transmission coupled to said internal combustion engine;
an intake manifold coupled to said internal combustion engine;

an impulse charge valve coupled to said intake manifold;

a controller for controlling said impulse charge valve;

wherein said controller detects a torque transient based upon at least one of a torque output of said internal combustion engine and a speed of said internal combustion engine and controls said impulse charge valve to compensate for said torque transient.

2. The engine control system of claim 1 wherein said internal combustion engine is a variable displacement engine.

3. The engine control system of claim 2 wherein said variable displacement internal combustion engine is an overhead valve engine.

4. The engine control system of claim 2 wherein said variable displacement internal combustion engine is an overhead cam engine.

5. The engine control system of claim 1 wherein said transmission is an electrically variable transmission.

6. The engine control system of claim 1 wherein said internal combustion engine includes a two step valve train.

7. A method of controlling torque for an internal combustion engine comprising the step of:

detecting an internal combustion engine speed;

activating an engine impulse charge valve to provide torque to increase said internal combustion engine speed when said engine speed is less than a first limit;

activating said impulse charge valve to decrease said internal combustion engine speed when said engine speed is greater than a second limit, wherein said second limit is greater than said first limit; and deactivating said impulse charge valve when said internal combustion engine speed is greater than said first limit and less than said second limit.

8. The method of claim 7 wherein said internal combustion engine is a variable displacement engine and controlling said impulse charge valve to allow said variable displacement engine to operate in a partially displaced operating mode.

9. The method of claim 7 further comprising modifying spark timing to control internal combustion engine speed.

10. The method of claim 7 further comprising determining if said internal engine combustion speed is above an upper limit; and stopping operation of said engine impulse charge valve.

11. A method of controlling an internal combustion engine comprising the step of:

detecting torque produced by an internal combustion engine;

activating an engine impulse charge valve to provide torque to increase said internal combustion engine torque when said internal combustion engine torque is less than a first limit;

activating said engine impulse charge valve to decrease said internal combustion engine torque when said internal combustion engine torque is greater than a second limit, wherein said second limit is greater than said first limit; and deactivating said impulse charge valve when said internal combustion engine torque is greater than said first limit and less than said second limit.

12. The method of claim 11 wherein said internal combustion engine is a variable displacement engine and controlling said impulse charge valve in conjunction with the operation of said variable displacement.

13. A method of controlling torque for an internal combustion engine comprising the step of:

determining the position of an exhaust valve in the internal combustion engine;

determining the position of an intake valve in the internal combustion engine;

controlling the opening of an impulse charger valve in fluid communication with the intake valve based upon the positions of the intake and exhaust valves; and closing the impulse charger valve before the intake valve closes.

14. The method of claim 13 further comprising modifying the lift of said intake valve.

15. The method of claim 13 further comprising opening the impulse charger valve after the exhaust valve has closed.

16. An impulse charger module for a vehicle comprising:

a sensor module that provides at least one of a torque output of an engine and a speed of said engine; and a control module that detects a torque transient based upon one of said torque and said speed and that activates an impulse charger valve after detecting said torque transient.

17. The impulse charger module of claim 16 wherein said control module detects said torque transient when said one of said torque and said speed is less than a first limit, detects said torque transient when said one of said torque and said speed is greater than a second limit, wherein said second limit is greater than said first limit, and deactivates said impulse charger valve when said one of said torque and said speed is greater than said first limit and less than said second limit.

18. The impulse charger module of claim 16 wherein an accessory of said vehicle generates said torque transient.

19. The impulse charger module of claim 18 wherein said accessory includes one of an alternator, a power steering pump, a water pump, a cooling fan, and an air conditioning compressor.

20. The impulse charger module of claim 16 wherein at least one of a transmission shift, a torque converter lock-up, a vehicle launch enhancement, and a traction control causes said torque transient.

* * * * *